United States Patent
Agbaje-Anozie

Patent Number: 5,642,397
Date of Patent: Jun. 24, 1997

[54] PAGING SYSTEM WHICH COMBINES A PAGING SIGNAL WITH A STANDARD BROADCAST BASEBAND SIGNAL

[75] Inventor: Uzoma Olugbo Agbaje-Anozie, Abeokuta, Nigeria

[73] Assignee: Alonzo Williams, San Francisco, Calif.

[21] Appl. No.: 277,114

[22] Filed: Jul. 19, 1994

Related U.S. Application Data

[63] Continuation of Ser. No. 694,439, May 1, 1991, abandoned.

[51] Int. Cl.$^6$ .................................................. H04Q 7/06
[52] U.S. Cl. ................. 379/57; 379/102; 340/825.44; 380/31; 455/13.3; 455/12.1; 455/17; 455/33.1
[58] Field of Search .......................... 379/57; 455/13.3, 455/33.1, 59, 101, 103; 340/825.44, 825.69, 825.72; 375/205; 380/31; 333/166

[56] References Cited

U.S. PATENT DOCUMENTS

| | | | |
|---|---|---|---|
| 2,436,824 | 3/1948 | Potter | 250/6 |
| 2,921,141 | 1/1960 | Enikeieff | 179/82 |
| 3,248,722 | 4/1966 | Blake | 340/311 |
| 3,484,557 | 12/1969 | Ruthroff | 179/16 |
| 3,716,848 | 2/1973 | Schonholtz et al. | 340/311 |
| 3,818,145 | 6/1974 | Hanway | 179/41 A |
| 3,836,726 | 9/1974 | Wells et al. | 379/57 |
| 3,949,401 | 4/1976 | Hegler et al. | 343/200 |
| 4,117,405 | 9/1978 | Martnez | 455/260 |
| 4,151,373 | 4/1979 | Widmer et al. | |
| 4,178,475 | 12/1979 | Taylor et al. | 179/2 EC |
| 4,320,514 | 3/1982 | Haskell | 375/1 |
| 4,325,057 | 4/1982 | Bishop | 340/539 |
| 4,350,969 | 9/1982 | Greer | 340/23 |

(List continued on next page.)

FOREIGN PATENT DOCUMENTS

| | | | |
|---|---|---|---|
| 093005586 | 3/1993 | WIPO | 455/51.2 |

OTHER PUBLICATIONS

America Online, "AM/FM radio and Data receiver for the Personal Computer" Dec. 1995.
Lempel, Ziv, "On the Complexity of Finite Sequences" IEEE Transactions on Information Theory, Jan. 1976.
Chakrabarti, Tomlinson, "Design of Sequences with Specified Autocorrelation and Cross Correlation", IEEE Nov. 1976.
Taub, Schilling, "Principles of Communication Systems", 1986, pp. 113–178.
Mazda, "Electronics Engineer's Reference Book," 1985 p. 47/10–11.
Holems, Chen, "Acquisition Time Performance of PN Spread Spectrum Systems", IEEE Transactions on Communication Aug. 1977.
Key, "An Analysis of the Structure and Complexity of Non–linear Binary Sequence Generators", IEEE Transactions on Information Nov. 1976.

*Primary Examiner*—William Cumming
*Attorney, Agent, or Firm*—Townsend and Townsend and Crew

[57] ABSTRACT

An electronic paging system and method for transmitting paging signals over a broadcast network, such as a standard pre-existing commercial radio broadcast system, adds paging signals to a normal radio baseband signal for non-interferential co-transmission therewith over the existing standard radio broadcast transmission system. A telephone interface receives paging information via normal telephone lines. The paging information is used to pseudo-randomly frequency-hop a frequency-synthesized signal which is added to the baseband audio of a standard commercial radio signal. This composite signal is then used to modulate the standard commercial radio broadcast carrier in the normal manner. Mobile pagers, or "beepers," receive and selectively decode (i.e. pseudo-randomly frequency-dehop) the standard commercial broadcast signal to determine whether and which pager is being summoned, i.e. addressed. The respective addresses of the individual pagers within the system correspond to start addresses used in pseudo-random code generators within the pager transmitter and each pager receiver.

3 Claims, 3 Drawing Sheets

U.S. PATENT DOCUMENTS

| | | | |
|---|---|---|---|
| 4,353,065 | 10/1982 | Mori | 340/825.44 |
| 4,356,519 | 10/1982 | Cogdell, Jr. | 360/61 |
| 4,363,129 | 12/1982 | Cohn et al. | 455/17 |
| 4,403,212 | 9/1983 | Masaki | 379/57 |
| 4,435,843 | 3/1984 | Eilers et al. | 455/205 |
| 4,479,226 | 10/1984 | Prabhu et al. | 375/1 |
| 4,490,579 | 12/1984 | Godoshian | 179/2 EC |
| 4,499,567 | 2/1985 | Armstrong | 369/7 |
| 4,518,822 | 5/1985 | Martnez | 379/102 |
| 4,601,043 | 7/1986 | Hardt et al. | 375/1 |
| 4,628,506 | 12/1986 | Sperlich | 455/13.3 |
| 4,653,069 | 3/1987 | Roeder | 380/31 |
| 4,691,341 | 9/1987 | Knoble et al. | 379/97 |
| 4,713,808 | 12/1987 | Gaskill et al. | 340/825.44 |
| 4,741,020 | 4/1988 | Deal et al. | 379/67 |
| 4,742,513 | 5/1988 | Yamaguchi | 370/94 |
| 4,769,642 | 9/1988 | Davis et al. | 340/825.44 |
| 4,851,830 | 7/1989 | Andros et al. | 340/825.44 |
| 4,856,088 | 8/1989 | Oliwa et al. | 455/349 |
| 4,866,732 | 9/1989 | Carey et al. | 375/1 |
| 4,868,560 | 9/1989 | Oliwa et al. | 340/825.44 |
| 4,868,860 | 9/1989 | Andros et al. | 379/57 |
| 4,873,520 | 10/1989 | Fisch et al. | 340/825.44 |
| 4,875,229 | 10/1989 | Palett et al. | 379/58 |
| 4,882,579 | 11/1989 | Siwiak | 340/825.44 |
| 4,905,003 | 2/1990 | Helferich | 341/110 |
| 4,908,828 | 3/1990 | Tikalsky | 371/69.1 |
| 5,008,952 | 4/1991 | Davis et al. | 455/12.1 |
| 5,010,317 | 4/1991 | Schwendeman et al. | 455/12.1 |
| 5,025,234 | 6/1991 | De Luca | 333/166 |
| 5,122,795 | 6/1992 | Cubley et al. | 340/825.44 |
| 5,224,121 | 6/1993 | Schorman | 455/33.1 |
| 5,510,778 | 4/1996 | Krieter | 340/825.44 |

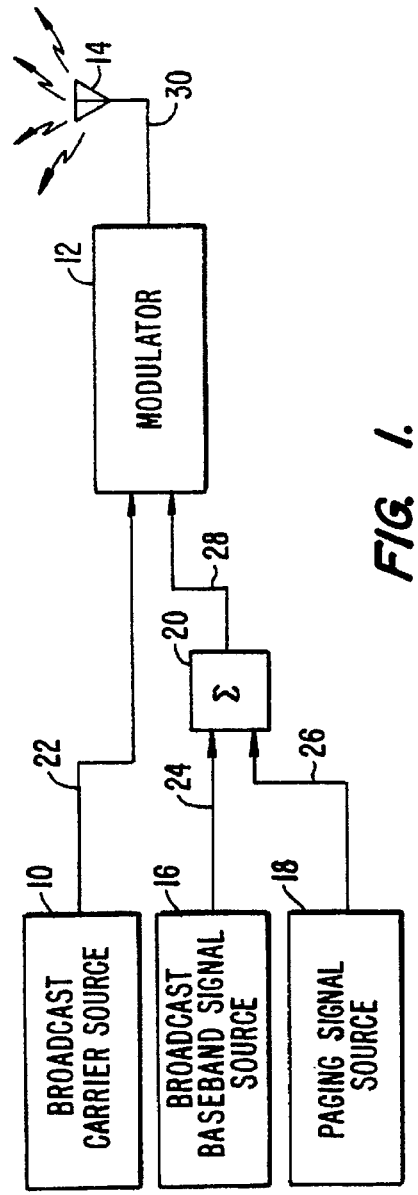
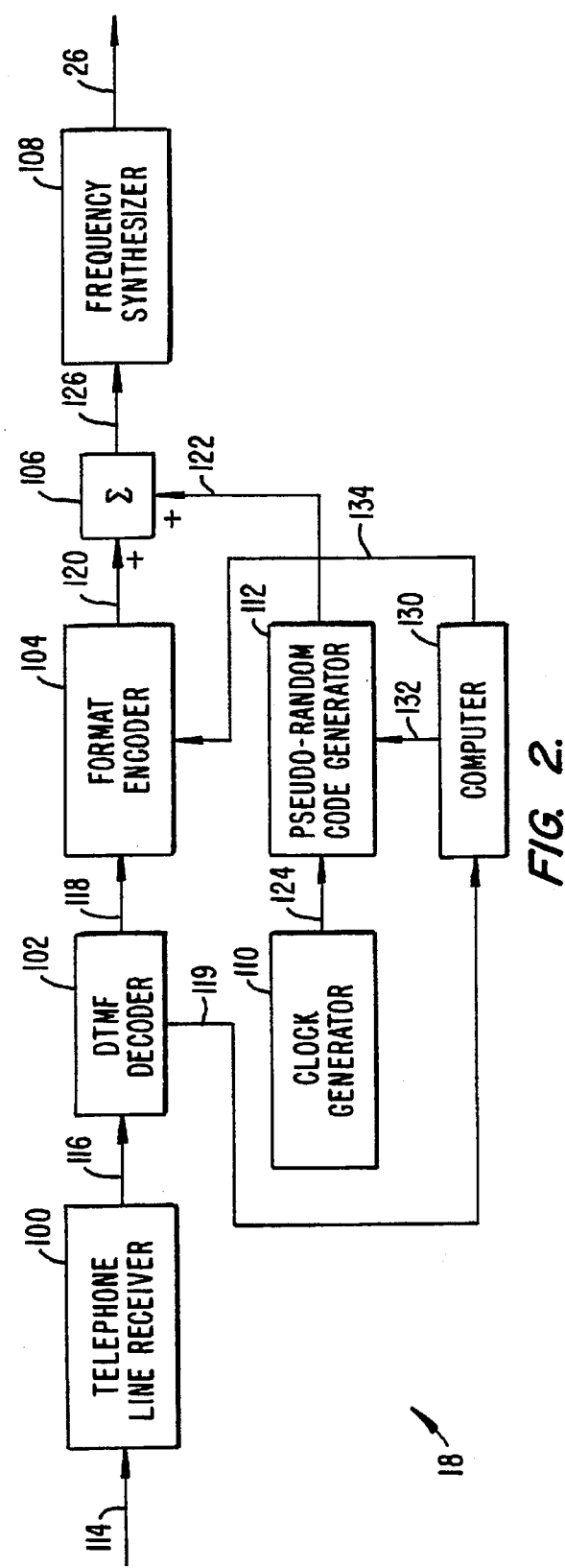

PAGING SYSTEM WHICH COMBINES A PAGING SIGNAL WITH A STANDARD BROADCAST BASEBAND SIGNAL

This application is a continuation of application Ser. No. 07/694,439, filed May 1, 1991 abandoned.

BACKGROUND OF THE INVENTION

1. Field of the Invention

The present invention relates to electronic paging systems, and in particular, to direct access electronic paging systems using digitally encoded radio frequency signals.

2. Description of the Related Art

Personal mobile pagers, or "beepers," have become increasingly common and more widely used. In particular, individuals whose occupations or personal circumstances require that they be accessible at all times, at least by telephone, find such pagers to be indispensable.

Typical electronic paging systems use radio frequency transmitters to access the individual mobile pagers associated with that particular system. A person wishing to page, or "beep," someone else's pager telephones the control center for the paging system. Either by conversing with an operator or entering information electronically over the telephone lines, e.g. via a Touch-Tone® key pad, the caller can specify which individual pager they wish to access. The appropriate access data is then transmitted over the radio frequency transmitter. The corresponding pager responds, e.g. by flashing a lamp, beeping or vibrating, thereby alerting its user that they are being summoned. More sophisticated pagers can also receive and display information informing its user as to the identity of the caller or the telephone number at which the caller wishes to be contacted.

Rising sophistication and falling costs of modern computer systems have allowed paging systems to become more sophisticated and less expensive to establish and operate. However, a major cost and obstacle to establishing and operating a paging system continues to be the radio frequency transmitter portion of the system. Dedicated radio frequency transmission systems can be and generally are quite expensive. Furthermore, obtaining a license and certification for the transmitter can be costly and very time consuming. With the advent and increasing use of such things as cellular telephones and other means of mobile communications, the radio frequency spectrum has become extremely crowded. Therefore, obtaining a frequency allocation and license for a new paging system is difficult, and in urban areas in particular, frequently impossible.

In rural areas this problem can be more acute. Aside from the expense and difficulty of establishing and licensing a paging system, profitability of operating the system may not be possible, depending upon the number of users or customers in the rural area. The area of coverage afforded by the transmitter may not include enough potential users to support the system.

Whether in urban or rural areas, these problems of cost, licensing and profitability of a paging system tend to reduce the number of systems competing in the marketplace. This lack of competition keeps user costs high and often tends to discourage any motivation among existing systems' operators to improve features or service.

One means by which a paging system can be simplified involves providing the capability for the users, e.g. customers, to initiate the paging signals themselves. For example, U.S. Pat. No. 3,818,145 to Hanway discloses a system in which the users, via individual telephones, can access the paging system to initiate their own paging signals. Thus, operation of the system from the perspective of the owner-operator can potentially be simplified. However, a dedicated radio signal transmission system is needed, which, as discussed above, is generally quite costly.

Another means by which a paging system can be simplified involves using already existing radio signal transmission equipment to provide the media through which the system's pagers can be accessed. For example, U.S. Pat. No. 4,908,828 to Tikalsky discloses a system in which a user, via a host interface, transmits paging signals over several FM radio stations which are tied together in a network. The paging signals are transmitted in the SCA ("subsidiary communication authorization") band, which is normally used to transmit background music, weather, time signals, educational information, etc. However, a network of several radio transmitters, accessed through a single host interface, are needed, thereby resulting in a high cost system, as discussed above. Furthermore, such a system interferes with normal usage of the SCA band.

Therefore, it would be desirable to have a simplified means by which establishing, licensing and profitably operating a paging system could be accomplished more quickly and economically.

SUMMARY OF THE INVENTION

An electronic paging system and method in accordance with the present invention provides means by which an electronic paging system can be quickly and economically established and profitably operated.

A paging system transmitter in accordance with the present invention receives externally generated, user-initiated pager message signals, such as dual-tone, multiple-frequency ("DTMF") encoded signals received over a telephone line. The pager message signal is decoded to obtain the digital pager message data contained therein. This decoded data is then re-encoded as a data packet in a format suitable for transmission and added to a pseudo-random digital code generated according to K-tuples from a pseudo-noise ("PN") sequence. The resultant pseudo-random data is used to frequency-hop the output signal of a digital frequency synthesizer over the bandwidth of the broadcast signal. The frequency-hopped signal is modulated according to M-ary frequency-shift keying. The frequency-hopped and frequency-shift-keyed signal is combined with a standard broadcast baseband signal, such as the audio program information for a standard commercial radio broadcast signal. This combined signal is then used to modulate a standard radio broadcast carrier signal in the normal manner.

A paging system receiver in accordance with the present invention is tuned to receive the standard commercial radio broadcast signal and demodulates the broadcast signal to separate the normal broadcast baseband signal from the frequency-hopped paging signal. The paging signal is frequency-dehopped to produce the original pseudo-random data. The pseudo-random digital code is subtracted out, and the resulting data packet is selectively decoded for display, storage or audio playback.

The addresses of the individual pagers correspond to start addresses for a pseudo-random code generator within the paging system transmitter. The start addresses determine the pseudo-random code sequence, which in turn, determines the frequency hopping sequences of the transmitted pager signal. The paging system receivers have similar pseudo-random code generators for decoding the received pager signals. The pager being addressed uses the same start address as that used by the transmitter. Therefore, the addressed pager is able to decode the pager signal intended for its user's reception.

Thus, in accordance with the present invention, existing transmission equipment associated with an existing standard radio broadcast system can be used to convey individual, user-initiated pager message signals. Minimal additional equipment is needed to establish and operate an electronic paging system according to the present invention. Furthermore, normal operation of the host transmission/reception system experiences minimal interference.

These and other objectives, features and advantages of the present invention will be understood upon consideration of the following detailed description of the invention and the accompanying drawings.

BRIEF DESCRIPTION OF THE DRAWINGS

FIG. 1 is a block diagram of a preferred embodiment of a paging system transmitter in accordance with the present invention.

FIG. 2 is a block diagram of a preferred embodiment of a paging signal source used within the paging transmitter of FIG. 1.

DETAILED DESCRIPTION OF THE INVENTION

Figure 3:
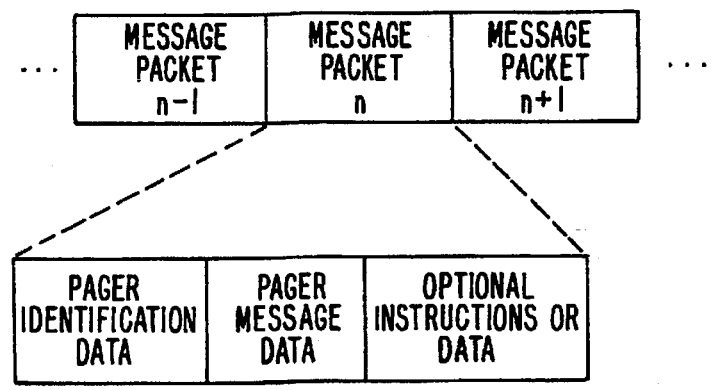
FIG. 3 illustrates an exemplary pager message signal format within a packetized pager message signal stream.

Referring to FIG. 1, a preferred embodiment of a standard broadcast transmission system using a paging system in accordance with the present invention includes a standard broadcast carrier source 10, a standard broadcast carrier modulator 12, an antenna 14, a standard broadcast baseband signal source 16, a paging signal source 18 and a signal summer 20, connected substantially as shown. The standard broadcast carrier source 10 provides the carrier frequency signal which is modulated within the modulator 12 for transmission over the antenna 14.

The standard broadcast carrier signal (i.e. the signal to be modulated) has a frequency which lies within the standard commercial broadcast spectrums, such as those commonly referred to as AM or FM radio frequency bands, which are well known in the art. For example, a standard FM broadcast carrier signal has a frequency within the approximate frequency range of 88–108 megahertz ("MHz").

The standard broadcast baseband signal source 16 provides the standard broadcast baseband signal 24 ordinarily used to modulate the standard broadcast carrier signal. For example, for a standard FM radio broadcast system, the standard broadcast baseband signal (i.e. the modulating signal 24) would be the normal program audio information, such as the voice of a disc jockey, music or commercial advertisements.

In accordance with the present invention, a paging signal source 18 is used to provide a pager signal 26 for combining, e.g. linearly summing, with the standard broadcast baseband signal 24 via a signal summing means 20. The signal summing means 20 preferably includes a signal summing circuit which substantially linearly combines its input signals 24, 26 to produce a combined, or composite, signal 28 for modulating the standard broadcast carrier signal 22. As discussed more fully below, the pager signal 26 is produced by the paging signal source 18 in such a manner as to not interfere with the standard broadcast baseband signal 24 (nor interfere with the use of an associated SCA band), and to similarly not interfere with the modulation operation normally carried out within the modulator 12. The modulated carrier signal 30 is then transmitted via the antenna 14 in the normal manner known in the art.

Referring to FIG. 2, a paging signal source 18 in accordance with a preferred embodiment of the present invention includes a telephone line receiver 100, a DTMF (dual-tone, multiple-frequency) decoder 102, a format encoder 104, an adder 106, a digital frequency synthesizer 108, a clock generator 110, a pseudo-random code generator 112 and a computer 130, substantially as shown. As discussed further below, the paging signal source 18 receives a DTMF-encoded pager message and address signal 114 via a telephone line (not shown), decodes the DTMF signal, selectively re-encodes (e.g. formats) the signal and provides a frequency-hopped pager signal 26.

The telephone line receiver 100 is coupled to receive the pager message and address signal 114 from a telephone line (not shown). The telephone line receiver 100 preferably includes a buffer amplifier, many types of which are well known in the art.

The DTMF decoder 102 receives the buffered pager message and address signal 116 and decodes the dual-tone, multiple-frequency encoded pager message 118 and address 119 signals. It should be recognized that the decoder 102 can include other well known types of signal decoders as appropriate, depending upon the encoding format of the pager message signal 114 received from the telephone line.

The format encoder 104 receives the decoded pager message signal 118 and selectively re-encodes the signal to a format for transmission, in accordance with control data 134 from the computer 130. For example, referring to FIG. 3, the format encoder 104 can encode the DTMF-decoded signal 118 into any desired form of digital data, selectively append pager identification data (as well as other optional instructions or data) and then packetize the resultant pager message signal.

The adder 106 receives and adds the encoded signal 120 and a pseudo-random code signal 122 (discussed further below), which is provided by the pseudo-random code generator 112, which in turn, is clocked by a clock signal 124 from the clock generator 110. As discussed more fully below, the sum signal 126 drives (e.g. addresses) the frequency synthesizer 108 to produce the pager signal 26.

Figure 4:
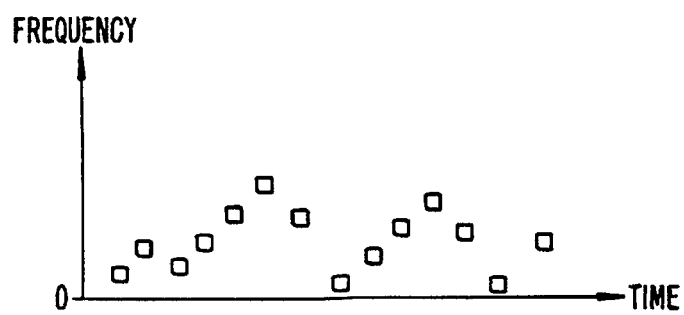
FIG. 4 illustrates an exemplary frequency-versus-time graph for the paging signal of the system of FIG. 1.

The clock signal 124 from the clock generator 110 clocks the pseudo-random code generator 112 which produces a pseudo-random code 122 comprising K-tuples according to a pseudo-noise ("PN") sequence (discussed more fully below). Several of such types of PN code generators are well known in the art. Summing the PN code 122 to the formatted pager signal 120 produces a pseudo-random sum signal 126. This sum signal 126 drives the frequency synthesizer, causing it to produce an output signal 26 which is hopped in frequency in accordance with the PN-coded sum signal 126. FIG. 4 illustrates an exemplary frequency-versus-time graph of the frequency hopping nature of the signal 26.

Figure 5:
FIG. 5 illustrates an exemplary baseband frequency spectrum for a standard FM radio broadcast system.

As discussed above, this frequency-hopped signal 26, combined with the broadcast baseband signal 24, modulates the broadcast carrier 22 (FIG. 1). In the case of a conventional FM radio broadcast signal, this modulation will have an approximate total possible bandwidth of 150 kilohertz ("KHz"), with sidebands of approximately 75 KHz as seen in FIG. 5. The baseband signal, e.g. program audio, occupies the bottom end of the sideband spectrum, where typically F1=50 Hz and F2=15 KHz. Also shown is the SCA band allotment (53 Khz–75 KHz). The pager signal 26 will be frequency-hopped throughout this 75 KHz band.

In the paging signal source 18 (FIG. 2), the PN-coded signal 126 frequency-hopping the output 26 of the frequency synthesizer 108 is generated by modulating the frequency selection address, i.e. the PN-coded signal 122, with a code word 120 using modulo-$2^K$ addition as shown in FIG. 2. Every T seconds during a paging sequence, a signal 118 having K message bits is inputted to the encoder 104 and outputted as a signal 120 representing a K-bit message word $X_M$.

The pseudo-random code generator 112 has unique addresses assigned to each pager user. The pager address signal 119, part of the original pager message and address signal 114, is received by the computer 130 which generates the corresponding pager address code signal 132. This pager address code signal serves as the start address for the pseudo-random code generator 112. This results in the pseudo-random code generator 112 outputting a predetermined pseudo-random code signal 122 during a basic time interval T.

The basic time interval T is partitioned into L subintervals, each having a duration of $T_C$. These subintervals are represented by the periodicity of the clock signal 124 from the clock generator 110, where each clock signal 124 cycle has a period of $T_C$ second. Over each time subinterval, i.e. each clock 124 cycle $T_C$, the Mth user's pseudo-random code generator 112 generates a sequence $A_M$ of L numbers:

$$A_M = (A_{M1}, A_{M2}, A_{M3}, \ldots A_{MI}, \ldots A_{ML})$$

where:

$$A_{MI} \in \{0, 1, 2, \ldots, 2^K-1\}$$

Each sequence $A_M$ of L numbers (as represented by the PN-coded signal 122) is added modulo-$2^K$ to the message word $X_M$ (as represented by the encoded signal 120) to produce a new K-bit number $Y_M$ (as represented by the frequency address signal 126):

$$Y_M = X_M + A_M$$

Thus, every $T_C$ seconds, the frequency address $Y_M$ signal 126 selects a corresponding frequency for the digital frequency synthesizer 108 to output. The frequency hop sequence corresponds to the address of the Mth user's receiver 200.

Figure 6:
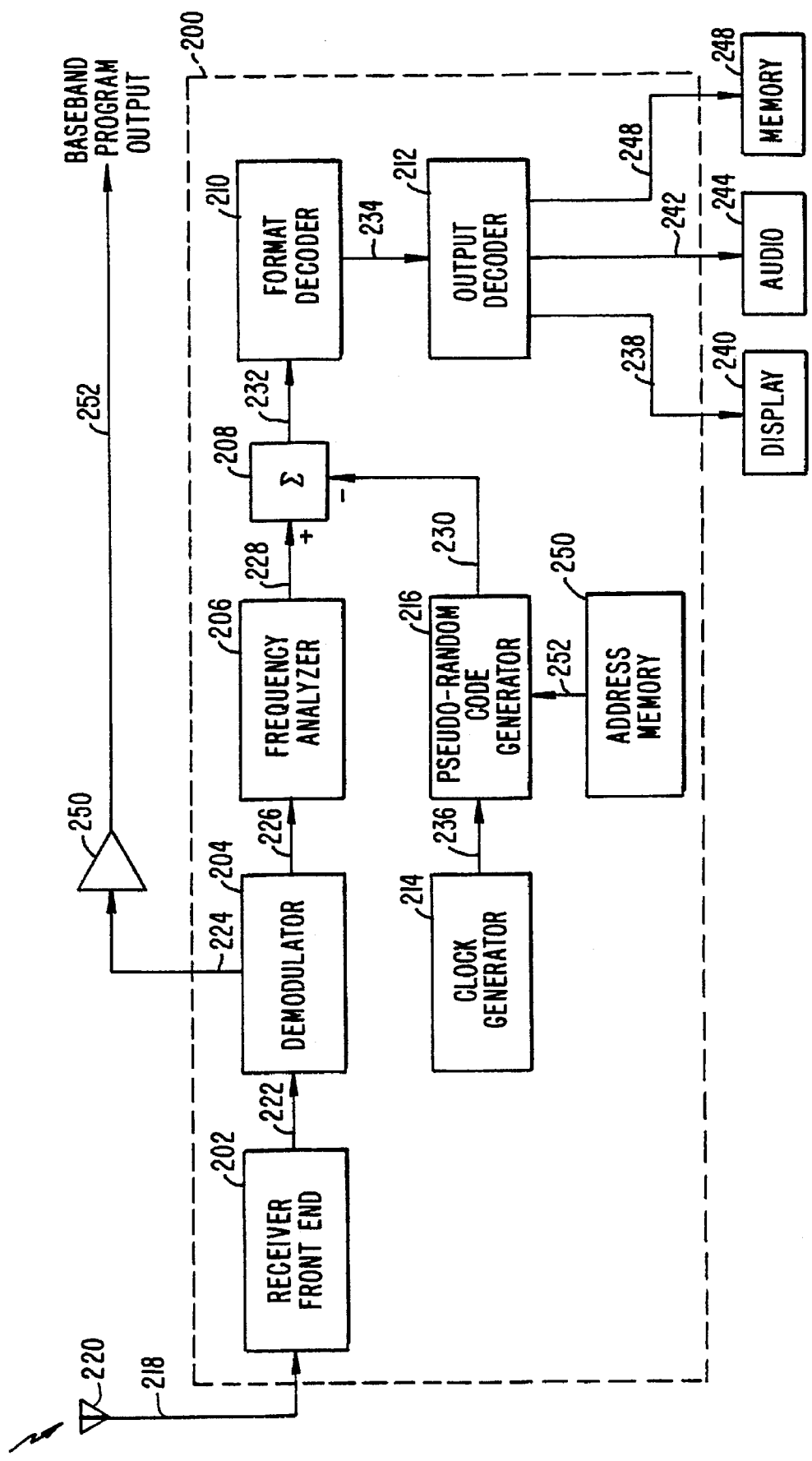
FIG. 6 is a block diagram of a preferred embodiment of a paging system receiver in accordance with the present invention.

Referring to FIG. 6, a paging signal receiver 200 in accordance with the present invention includes a receiver front end 202, demodulator 204, frequency analyzer 206, subtractor 208, format decoder 210, output decoder 212, clock generator 214, pseudo-random code generator 216 and address memory 250. The front end 202 receives and buffers a radio frequency signal 218 (containing the paging signal 26). The demodulator 204 receives and demodulates (e.g. frequency down-converts and frequency-demodulates) the buffered signal 222 to separate the normal baseband signal 224 (e.g. program audio) and the received pager signal 226. If desired, the baseband program signal 224 can be buffered by a buffer amplifier 250 to provide a baseband program output signal 252. For example, the paging signal receiver 200 can be incorporated as part of an FM radio receiver.

The frequency analyzer 206 analyzes the frequency spectrum of each $T_C$-second interval of the received and down-converted pager signal 226 for K-bit word content. The frequency analyzer 206 outputs a signal 228 representing a K-bit word $Z_M$ which corresponds to the frequency of its input signal 226. The analyzed signal 228 is demodulated by modulo-$2^K$ subtraction of the PN-coded signal 230 (generated by the pseudo-random code generator 216 and clock generator 214 in the manner as discussed above). If this particular pager receiver 200 is the Mth user being "paged," i.e. addressed, the PN-coded signal 230 represents the same sequence $A_M$ of L numbers as used by the paging signal source 18 (i.e. $Z_M = Y_M$). This will be true because the address memory 250 provides a start address 252 to the receiver's pseudo-random code generator 216 which corresponds to the start address 132 used in the pseudo-random code generator 112 in the pager signal source 18 (as discussed above). This produces a demodulated signal 232 representing the original K-bit message word $X_M$:

$$X_M = Z_M - A_M$$

This demodulated signal 232 representing the original K-bit message word $X_M$ is decoded by a format decoder 210 to produce a signal 234 representing the original K message bits. This format decoded signal 234 is then further decoded by an output decoder to selectively produce output signals 238, 242, 246 representing the K message bits for display on some form of display device 240 (e.g. liquid crystal display), for playback on an audio device 244 (e.g. speaker), or storage in some form of memory device 248 (e.g. random access memory).

Further information regarding the above-discussed encoding and decoding technique can be found in the following references: J. K. Holmes & C. C. Chen, "Acquisition Time Performance of PN Spread-Spectrum Systems," IEEE Transactions On Communications, Vol. COM-25, No. 8, August 1977, pp. 778–83; E. L. Key, "An Analysis of the Structure and Complexity of Nonlinear Binary Sequence Generators," IEEE Transactions On Information Theory, Vol. IT-22, No. 6, November 1976, pp. 732–736; A. Lempel and J. Ziv, "On the Complexity of Finite Sequences," IEEE Transactions On Information Theory, Vol. IT-22, No. 1, January 1976, pp. 75–81; N. B. Chakrabarti and M. Tomlinson, "Design of Sequences With Autocorrelation and Cross-Correlation," IEEE Transactions On Communications, Vol. COM-24, No. 10, November 1976, pp. 1246–51.

Thus, based upon the foregoing discussion, a paging system in accordance with the present invention allows a paging signal to be co-transmitted with a standard broadcast baseband signal, such as an FM radio program. This allows a paging signal to be transmitted simultaneously with a standard broadcast baseband signal without mutual interference. Similarly a paging system in accordance with the present invention allows a paging signal to be co-received with a standard broadcast baseband signal. This allows a paging signal to be received and processed simultaneously with a standard broadcast baseband signal without mutual interference.

It should be understood that various alternatives to the embodiments of the present invention described herein can be employed in practicing the present invention. It is intended that the following claims define the scope of the present invention, and that structures and methods within the scope of these claims and their equivalents be covered thereby.

What is claimed is:

1. A paging system for providing a paging signal combined with a standard broadcast baseband signal for simultaneous transmission over an existing broadcast system, said paging system comprising:

a receiver for receiving a standard broadcast signal transmitted from a broadcast system and providing a demodulated pager message signal, said standard broadcast signal including a single standard broadcast baseband signal and a pager signal;

a frequency analyzer for extracting a hopped pager message signal from said demodulated pager message signal;

a subtractor for subtracting a modulo-$2^k$ PN-coded signal representing the address of a particular pager from said hopped pager message signal of said frequency analyzer to detect the presence of a hopped sequence associated with the address of said particular pager, if there is match between said hopped sequence and the fixed sequence of said particular pager then the demodulated hopped message signal associated with the sequence is provided to a decoder, said decoder decodes the received hopped message signal and a decoded message signal is provided to an output device; and a transmitter for generating said pager message signal, said pager message signal including the address of a destination pager and the contents of the message in a format where the destination address is provided by the hopping sequence associated with the destination pager and the contents of the message is included in the pager message signal.

2. A paging system as recited in claim 1, further comprising a signal adder coupled to said transmitter for receiving and combining said hopped pager message signal with a standard broadcast baseband signal to provide a combined transmission signal.

3. A paging system for providing a paging signal for transmission over a standard broadcast baseband signal as in claim 1, wherein said single standard broadcast baseband signal is a fixed allocated frequency carrier within a FCC allocated broadcast spectrum.

* * * * *